US012784205B2

(12) United States Patent
Nakazawa et al.

(10) Patent No.: US 12,784,205 B2
(45) Date of Patent: Nov. 3, 2026

(54) BIOLOGICAL IMAGE PROCESSING PROGRAM, BIOLOGICAL IMAGE PROCESSING APPARATUS, AND BIOLOGICAL IMAGE PROCESSING METHOD

(71) Applicant: TOHOKU UNIVERSITY, Sendai (JP)

(72) Inventors: Toru Nakazawa, Sendai (JP); Parmanand Sharma, Sendai (JP)

(73) Assignee: TOHOKU UNIVERSITY, Sendai (JP)

( * ) Notice: Subject to any disclaimer, the term of this patent is extended or adjusted under 35 U.S.C. 154(b) by 176 days.

(21) Appl. No.: 18/700,985

(22) PCT Filed: Oct. 13, 2021

(86) PCT No.: PCT/JP2021/037976

§ 371 (c)(1),
(2) Date: Apr. 12, 2024

(87) PCT Pub. No.: WO2023/062764

PCT Pub. Date: Apr. 20, 2023

(65) Prior Publication Data

US 2024/0420321 A1 Dec. 19, 2024

(51) Int. Cl.
*G06T 7/00* (2017.01)
*G06T 3/40* (2006.01)
(Continued)

(52) U.S. Cl.
CPC .............. *G06T 7/0012* (2013.01); *G06T 3/40* (2013.01); *G06T 7/10* (2017.01); *G06V 10/44* (2022.01);
(Continued)

(58) Field of Classification Search
CPC ........... G06T 7/0012; G06T 3/40; G06T 7/10; G06T 2207/30041; G06T 2207/30101;
(Continued)

(56) References Cited

U.S. PATENT DOCUMENTS

2021/0279863 A1 9/2021 Jacenków et al.

FOREIGN PATENT DOCUMENTS

CN 111259906 A 6/2020
CN 111882566 A 11/2020
(Continued)

OTHER PUBLICATIONS

Wang, C., Wang, Y., Liu, Y., He, Z., He, R., & Sun, Z. (2019). ScleraSegNet: An attention assisted U-Net model for accurate sclera segmentation. IEEE Transactions on Biometrics, Behavior, and Identity Science, 2(1), 40-54. (Year: 2019).*
(Continued)

*Primary Examiner* — Jennifer Mehmood
*Assistant Examiner* — Vaisali Rao Koppolu
(74) *Attorney, Agent, or Firm* — Myers Wolin, LLC

(57) ABSTRACT

A non-transitory computer readable storage medium encoded with computer readable biological image processing instructions, which. when executed by processor circuitry, cause the processor circuitry to perform segmentation of a biological image to perform: reducing a size of the biological image that has been input and extracting a feature point, by adding an attention block for averaging channels to a convolution block of the biological image; and outputting information relating to a feature image obtained by segmenting the biological image including the extracted feature point, by contracting the channels in a state in which the attention block has been added to the convolution block.

18 Claims, 11 Drawing Sheets

(51) Int. Cl.
*G06T 7/10* (2017.01)
*G06V 10/44* (2022.01)

(52) U.S. Cl.
CPC ............... *G06T 2207/30041* (2013.01); *G06T 2207/30101* (2013.01)

(58) Field of Classification Search
CPC ............. G06T 2207/20084; G06T 7/00; G06T 7/11; G06T 2207/20224; G06V 10/44; G06V 40/193; G06V 20/695; A61B 3/12
See application file for complete search history.

(56) References Cited

FOREIGN PATENT DOCUMENTS

| | | | | | |
|---|---|---|---|---|---|
| CN | 112446892 | A | | 3/2021 | |
| CN | 113592843 | A | * | 11/2021 | ........... G06F 18/214 |
| CN | 113744178 | A | * | 12/2021 | ............. G06N 3/045 |
| JP | 2019-187551 | A | | 10/2019 | |
| JP | 2020-163100 | A | | 10/2020 | |
| JP | 2020166813 | A | * | 10/2020 | |
| JP | 2021-140769 | A | | 9/2021 | |

OTHER PUBLICATIONS

Shan, T., & Yan, J. (2021). SCA-Net: A spatial and channel attention network for medical image segmentation. IEEE Access, 9, 160926-160937. (Year: 2021).*

Liu, X., Song, L., Liu, S., & Zhang, Y. (2021). A review of deep-learning-based medical image segmentation methods. Sustainability , 13(3), 1224. (Year: 2021).*

Wang, J. et al., "AEC-Net: Attention and Edge Constraint Network for Medical Image Segmentation", 42nd Annual International Conference of the IEEE Engineering in Medicine & Biology Society (EMBC), Aug. 27, 2020, pp. 1616-1619, Date of Conference: Jul. 20-24, 2020, Date Added to IEEE Xplore: Aug. 27, 2020.

Ronneberger et al., "U-Net: Convolutional Networks for Biomedical Image Segmentation", 2015, pp. 234-241, Springer International Publishing, Switzerland.

Hu et al., "Squeeze-and-Excitation Networks", IEEE Transactions on Pattern Analysis and Machine Intelligence, Aug. 2020, vol. 42, No. 8, 2011-23 doi: 10.1109/TPAMI.2019.2913372[published Online First: Epub Date].

English translation of the International Search Report issued by the Japan Patent Office for corresponding International Patent Application No. PCT/JP2021/037976, mailed on Dec. 28, 2021.

International Preliminary Report on Patentability issued by the International Bureau of WIPO on Apr. 16, 2024 for corresponding International Patent Application No. PCT/JP2021/037976, with an English translation.

Notice of Preliminary Rejection issued by the Korean Patent Office for corresponding Korean Patent Application No. 10-2024-7015838, mailed on Jul. 22, 2026, with an English translation.

Guo et al., "Automatic quantification of superficialfoveal avascular zone in optical coherencetomography angiography implementedwith deep learning", Visual Computing for Industry, Biomedicine, and Art, vol. 2, article No. 21, Springer Open, Dec. 2019.

Hamghalam et al., "Convolutional 3D to 2D Patch Conversion for Pixel-wise Glioma Segmentation in MRI Scans", arXiv:2010.10612, EESS IV, Oct. 2020.

Heisler et al., "Deep learning vessel segmentation and quantification of the foveal avascular zone using commercial and prototype OCT-A platforms", arXiv:1909.11289, Sep. 2019.

* cited by examiner

| TYPES OF DEEP LEARNING MODEL | TOTAL PARAMETERS | FILE SIZE (MB) | EXTRA CONTOUR | | DICE COEFFICIENT (D) | | | |
|---|---|---|---|---|---|---|---|---|
| | | | TOTAL CONTOUR | TOTAL IMAGES | PREDICTED | SD | LARGEST CONTOUR | SD |
| Unet | 28,340,931 | 332 | 51 | 40 | 0.9581 | 0.0186 | 0.9586 | 0.0185 |
| Unet_AB | 29,830,275 | 350 | 24 | 18 | 0.9584 | 0.0186 | 0.9586 | 0.0185 |
| Unet_AB_Upsampling | 24,466,627 | 287 | 23 | 21 | 0.9589 | 0.0197 | 0.9594 | 0.0194 |
| Unet_AB_Upsampling_Add | 12,259,523 | 144 | 23 | 16 | 0.9557 | 0.0315 | 0.9561 | 0.0312 |
| Unet_AB_128_Upsampling_Add | 2,673,795 | 32 | 45 | 35 | 0.9576 | 0.0232 | 0.958 | 0.023 |
| Unet_AB_64_Upsampling_Add | 673,347 | 8.3 | 204 | 46 | 0.9555 | 0.0371 | 0.9571 | 0.0355 |
| **LWBNA_Unet (THIS EMBODIMENT)** | **2,958,819** | **35** | **29** | **27** | **0.9578** | **0.0195** | **0.9584** | **0.019** |

FIG. 7

1. Unet, 2. Unet_AB, 3. Unet_AB_upsampling, 4. Unet_AB_upsampling_Add, 5. Unet_AB_128_upsampling_Add, 6. Unet_AB_128_upsampling_Add, 7. LWBNA_Unet

BIOLOGICAL IMAGE PROCESSING PROGRAM, BIOLOGICAL IMAGE PROCESSING APPARATUS, AND BIOLOGICAL IMAGE PROCESSING METHOD

CROSS-REFERENCE TO RELATED APPLICATION

This application is a National Phase under 35 U.S.C. 371 of PCT/JP2021/037976, filed on Oct. 13, 2021, and designated the U.S. The contents of which are wholly incorporated herein by reference.

SUMMARY

The technology described in the present specification relates to a biological image processing program, a biological image processing apparatus, and a biological image processing method.

BACKGROUND ART

A captured biological image (in other words, a medical image) may be denoised (in other words, enhanced in image quality) to segment a target site from the biological image.

For example, in Patent Literature 1, a medical image of a predetermined site of a subject is acquired, and a high-quality image is generated from the acquired medical image by using an image quality enhancement engine including a machine learning engine obtained by using learning data in which noise corresponding to a state of at least a partial region of the medical image is added to at least the partial region.

CITATION LIST

Patent Literature

Patent Literature 1: JP 2020-166813 A
Patent Literature 2: JP 2020-163100 A
Patent Literature 3: JP 2019-187551 A

Non-Patent Literature

Non-Patent Literature 1: U-Net: Convolutional Networks for Biological Image Segmentation; 2015; Cham. Springer International Publishing.

Non-Patent Literature 2: Hu J, Shen L, Albanie S, et al. Squeeze-and-Excitation Networks. IEEE Transactions on Pattern Analysis and Machine Intelligence 2020; 42 (8): 2011-23 doi: 10.1109/TPAMI. 2019. 2913372 [published Online First: Epub Date].

SUMMARY

Technical Problem

However, there is concern that denoising of a biological image may require complicated arithmetic processing and high-performance hardware resources.

In one aspect, the technique described in the present description aims to accurately perform segmentation of a biological image through simple arithmetic processing.

Solution to Problem

According to one aspect, a biological image processing program causes a computer for performing segmentation of a biological image to perform processing of: reducing a size of the biological image that has been input and extracting a feature point, by adding an attention block for averaging channels to a convolution block of the biological image; and outputting information relating to a feature image obtained by segmenting the biological image including the extracted feature point, by contracting the channels in a state in which the attention block has been added to the convolution block.

Advantageous Effects

As one aspect, segmentation of a biological image can be accurately performed through simple arithmetic processing.

BRIEF DESCRIPTION OF DRAWINGS

FIG. 7 is a table in which the performance of different types of deep learning models is compared.

DESCRIPTION OF EMBODIMENTS

Figure 1:
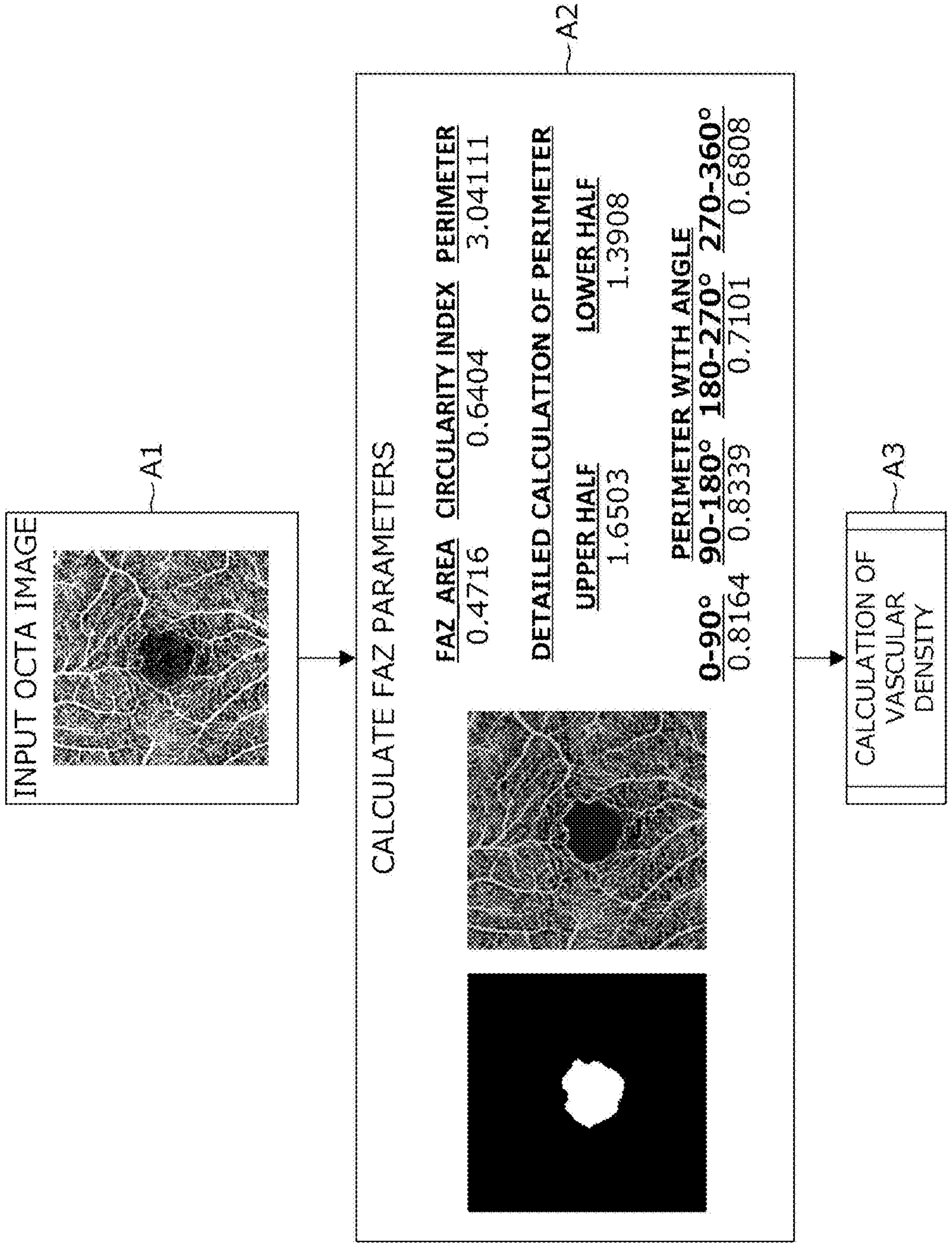
FIG. 1 is a diagram for describing biological image processing as an embodiment.

Hereinafter, embodiments will be described with reference to the drawings. However, the embodiments described below are merely examples, and there is no intention to exclude various modifications and applications of techniques that are not explicitly described in the embodiments. That is, the present embodiment can be modified and implemented in various ways without departing from the scope of the present embodiment.

In addition, each drawing is not intended to include only components illustrated therein, and may include other components. Hereinafter, in the drawings, parts denoted by the same reference numerals indicate the same or similar parts unless otherwise specified.

FIG. 1 is a diagram for describing biological image processing as an embodiment.

A program receives an input of a retinal optical coherence tomography angiographic (OCTA) image as an original image as indicated by reference numeral A1 (INPUT OCTA IMAGE).

The program segments and detects a foveal avascular zone (FAZ) region from the OCTA image and calculates FAZ parameters as indicated by reference numeral A2 (CALCULATE FAZ PARAMETERS). As the FAZ parameters, for example, an area (e.g., 0.4716 $mm^2$), a circularity index (e.g., 0.6404), a circumference length (a perimeter of 3.04111 mm), an upper half circumference length (an upper half detailed calculation of perimeter of, for example, 1.6503 mm), a lower half circumference length (a lower half detailed calculation of perimeter of, for example, 1.3908 mm), and circumference lengths of four quadrants (a perimeter with angle of, for example, 0.8164 mm at 0 to 90°, 0.8339 mm at 90° to 180°, 0.7101 mm at 180° to 270°, and 0.6808 mm at 270° to 360°) may be calculated for a FAZ area (FAZ_AREA). Further, a circularity index indicates becoming closer to a perfect circle as a value thereof becomes closer to 1, and indicates becoming closer to a straight line as a value thereof becomes closer to 0. The program determines the center of the FAZ area and calculates the perimeters of the upper and lower halves by dividing the boundary of the FAZ area into two parts that are the upper and lower halves.

The program calculates a vascular density as indicated by reference numeral A3 (CALCULATION OF VASCULAR DENSITY). Details of a vascular density calculation process will be described below with reference to FIG. 2.

Figure 2:
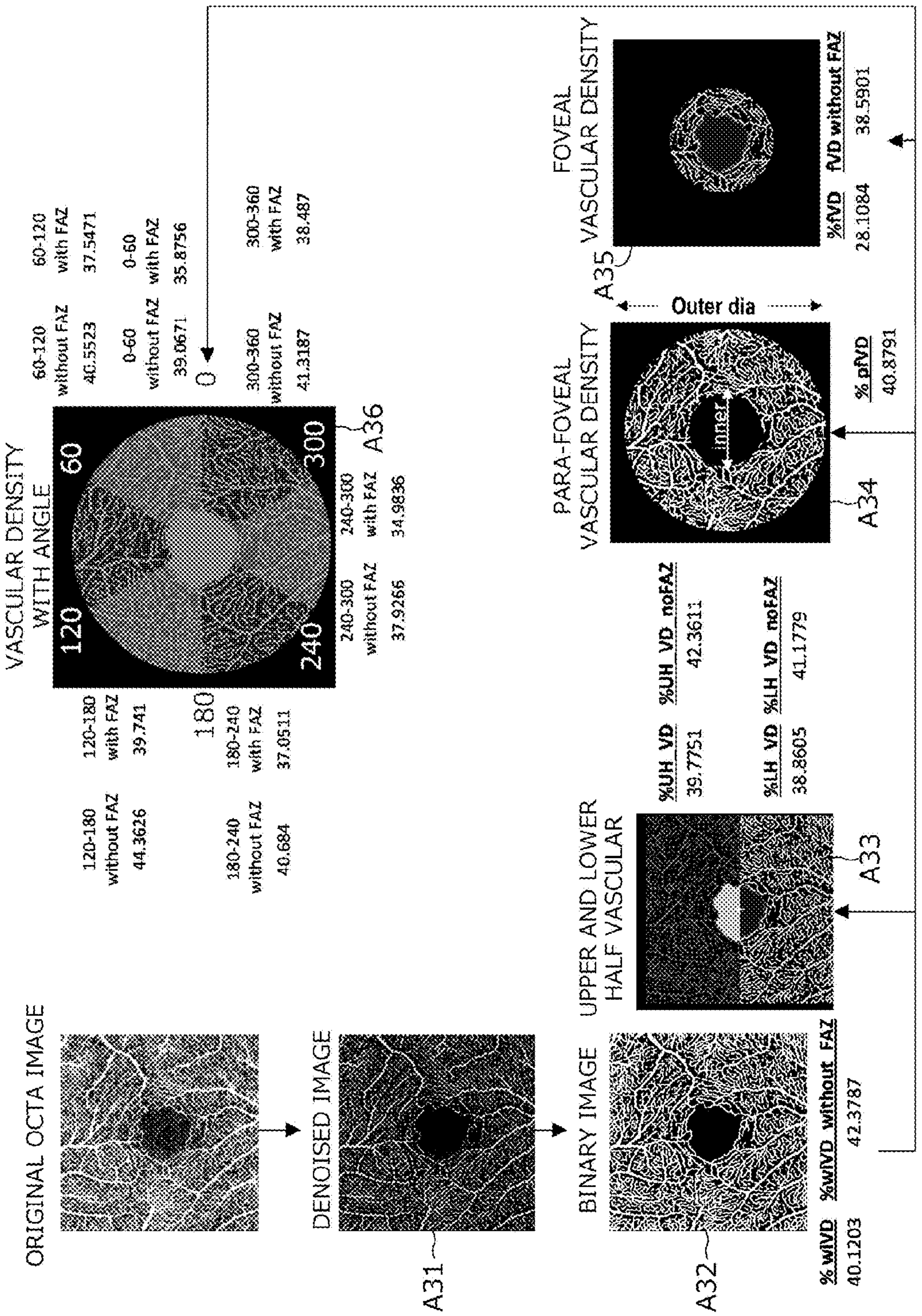
FIG. 2 is a diagram for describing details of a vascular density calculation process illustrated in FIG. 1.

FIG. 2 is a diagram for describing details of the vascular density calculation process illustrated in FIG. 1.

The program uses a trained deep learning (DL) model for an original OCTA image to densify the image to obtain a denoised image as indicated by reference numeral A31.

The program generates a binary image from the denoised image as indicated by reference numeral A32 to calculate a full image vascular density % wiVD (e.g., 40.1203) including the FAZ area and a full image vascular density % wiVD_without_FAZ (e.g., 42.3787) not including the FAZ area.

Since the center of the FAZ area is not exactly at the center point of the image as indicated by reference numeral A33, the program sets the center of the FAZ area as the center of the image. Then, the program divides the image into an upper half and a lower half from the center of the FAZ area, and calculates the vascular densities of the upper and lower halves based on the presence or absence of the FAZ area (UPPER AND LOWER HALF VASCULAR). In the illustrated example, the vascular density of the upper half including the FAZ area % UH_VD is 39.7751, the vascular density of the upper half not including the FAZ area % UH_VD noFAZ is 42.3611, the vascular density of the lower half including the FAZ area % LH_VD is 38.8605, and the vascular density of the lower half not including the FAZ area % LH_VD noFAZ is 41.1779. The program calculates the para-foveal vascular density % pfVD (e.g., 40.8791) as indicated by reference numeral A34.

The program calculates a foveal vascular density including the FAZ area % fVD (a foveal vascular density with faz of, for example, 28.1084) and a foveal vascular density not including the FAZ area % fVD_without_FAZ (a foveal vascular density without faz of, for example, 38.5901) as indicated by reference numeral A35.

The program calculates an angular region vascular density (VASCULAR DENSITY WITH ANGLE) for each of the six angular regions with or without the FAZ area as indicated by reference numeral A36. For example, the angular region vascular density at 0° to 60° including the FAZ area 0-60 with FAZ is 35.8756, and the angular region vascular density at 0° to 60° not including the FAZ area 0-60 without FAZ is 39.0671.

Figure 3:
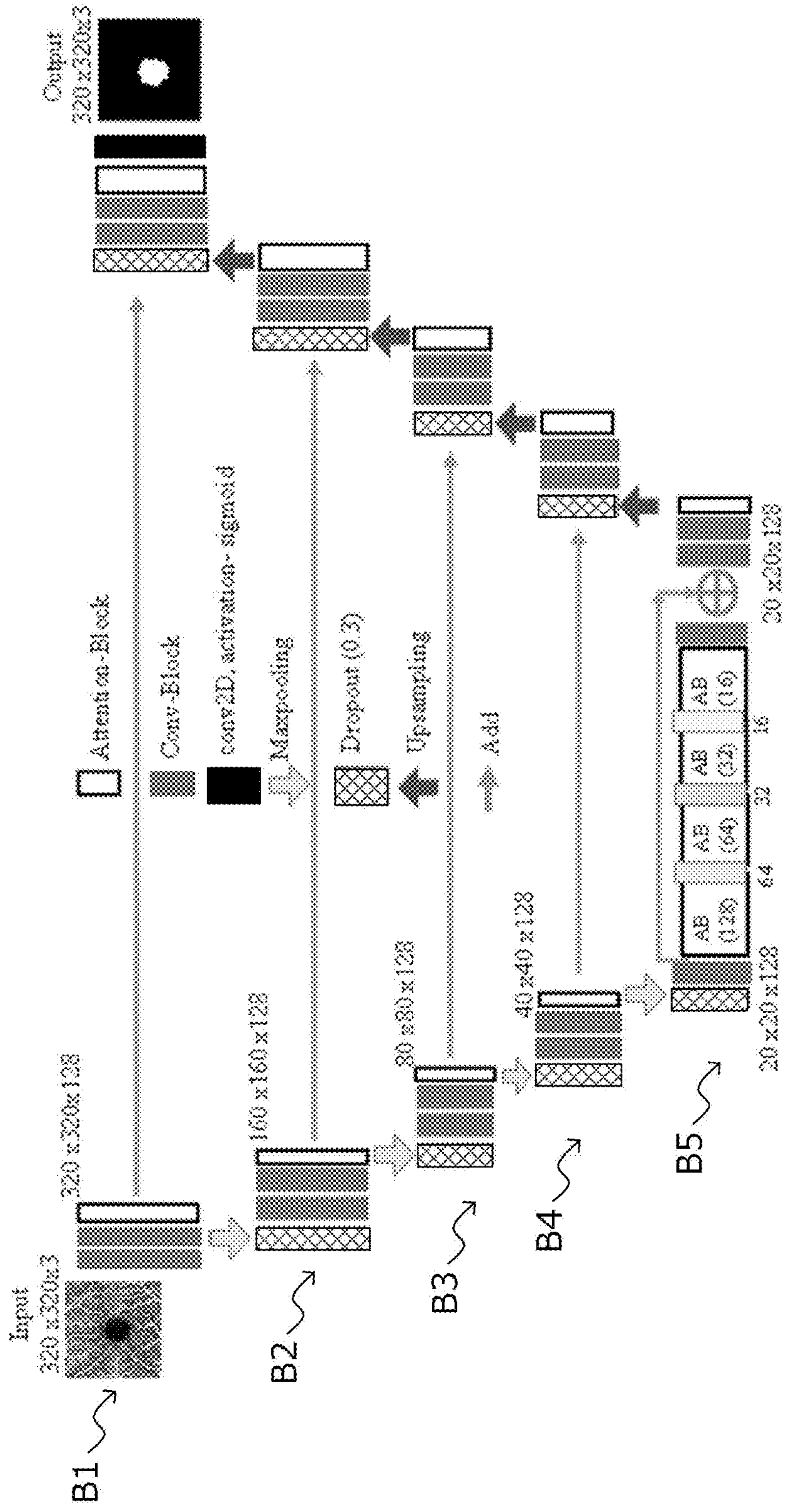
FIG. 3 is a diagram for describing a segmentation process for a biological image according to an embodiment.

FIG. 3 is a diagram for describing a segmentation process for a biological image according to an embodiment.

An example of a DL model designed for biomedical image segmentation is Unet (see, e.g., Non-Patent Literature 1).

Unet has a contracting path (in other words, an encoder for extracting feature points) and an expanding path with skip connection (in other words, a decoder for image reconstruction).

The structure of Unet relies on a cascaded recurrent neural network (CNN) to extract a region of interest. The simplest way to promote somite formation is to build up more layers to make the network deeper.

In general, the deeper the network, the more parameter multiplications occur, requiring more computation power and storage capacity.

FIG. 3 illustrates the architecture of a lightweight DL model designed for segmentation of ophthalmic images. The segmentation process illustrated in FIG. 3 utilizes Unet with an attention block in the contracting, expanding, and bottleneck paths.

In the layer indicated by reference numeral B1, although the size of the input image is 320×320 with three channels, the size remains in 320×320 but the number of channels is increased to 128. The size contracts to 160×160 in the layer indicated by reference numeral B2, the size contracts to 80×80 in the layer indicated by reference numeral B3, the size contracts to 40×40 in the layer indicated by reference numeral B4, and the size contracts to 20×20 in the layer indicated by reference numeral B5. Note that in each layer, the number of channels remains at 128.

Model parameters are trimmed by fixing the number of feature channels/filters to 128 in both the contracting and expanding paths, replacing the concatenation (used for skip connection) with the Add layer, and transposing the 2D convolution operation layer (conv2D, activation-sigmoid) with upsampling.

Each convolution operation block (Conv-Block) in FIG. 3 is made up of 3×3 convolution operation layers having the same padding, followed by a rectified linear unit (relu) for batch normalization and activation. Then, a dropout layer is used after maxpooling and upsampling.

In paying attention to the feature map layer as well as the contracting path and the expanding path, an attention block created by modifying a squeeze and excitation (SE) block (see, for example, Non-Patent Literature 2) is added.

In the attention block, global averaging of channels, followed by a fully connected layer, activation by relu and sigmoid functions, and multiplication of the resulting weights by each channel are performed. The combination of relu and sigmoid activation limits the channel attention weight to be between 0.5 and 1.0. That is, channels with low priority are suppressed. Here, the channels with low priority are channels with no feature points such as the outer shapes of FAZ areas or vascular parts. A biological image in which channels with no feature points is suppressed and only channels with a large number of feature points are included may be referred to as a feature image.

That is, channels with low priority may be reduced by half instead of eliminating the channels completely, and the network may determine importance of the channels in the next layer. In a Unet-type model, refinement of a high-level feature map at the center of the contracting and expanding paths is also important in accurate reconstruction of a segmented image.

In Non-Patent Literature 2 and the like, a feature map at a bottleneck was not examined. Therefore, the present embodiment introduces continuous narrowing of a channel by paying attention to a bottleneck. Here, only the functions of the decoder required to reconstruct a necessary segmented image are allowed. This is done by reducing the number of channels by half in successive layer blocks. For example, the number of channels decreases from 128 to 16 in four stages at the bottleneck (i.e., the middle block) indicated by reference numeral B5 in FIG. 3. A skip connection and an attention block following it is used for fine-tuning and the overall feature map before upsampling is enhanced.

In the expanding path from the middle block to the generation of the output image, contrary to the contracting path of the input image, the size is increased stepwise while the number of channels of the image is maintained at 128, and the output image has a size of 320×320 and three channels similar to the input image.

In the following, it will be described that bottleneck narrowing with attention block (Bottleneck Analysis or BNA) is significantly effective in identifying a fake FAZ area detected by the network in poor-quality OCTA images and helps to improve the overall segmentation accuracy of the FAZ.

The present embodiment utilizes reduction of an image size to extract important feature points and reduction of a channel at the bottleneck to reconstruct an accurate segmented image by the encoder network. In the present embodiment, this network is referred to as a lightweight bottleneck narrowing Unet with an attention block (LWBNA_UNet).

Figure 4B:
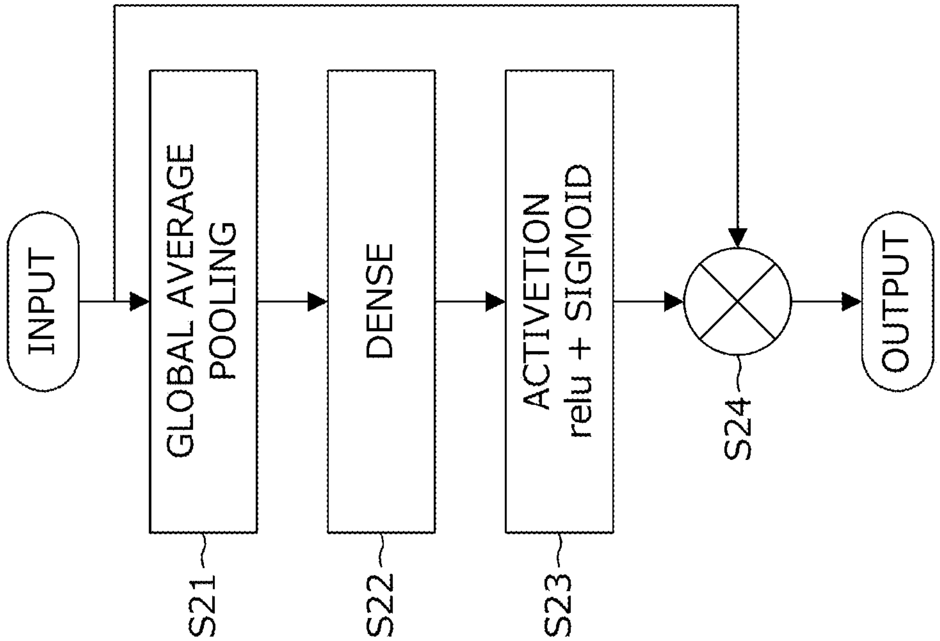
FIG. 4B is a flowchart for explaining processing for the attention block illustrated in FIG. 3.
Figure 4A:
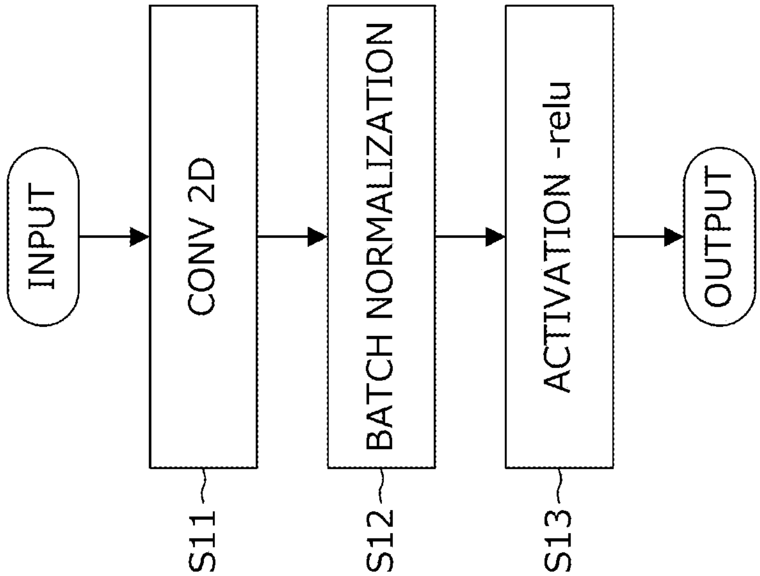
FIG. 4A is a flowchart for explaining processing for the convolution operation blocks illustrated in FIG. 3.

FIG. 4A is a flowchart for explaining processing for the convolution operation blocks illustrated in FIG. 3, and FIG. 4B is a flowchart for explaining processing for the attention block illustrated in FIG. 3.

In FIG. 4A, the convolution operation blocks are transposed to a 2D convolution operation layer (conv 2D, activation-sigmoid) by upsampling (step S11).

Batch normalization is performed on the convolution operation blocks (step S12).

The convolution operation blocks activate a relu (Activation-relu) (step S13). Then, the processing for the convolution operation blocks ends.

In FIG. 4B, the attention blocks perform global average pooling on the channels (step S21).

The attention blocks densify the channels (step S22).

The attention blocks activate the relu and sigmoid (ACTIVETION relu+sigmoid) (step S23).

The activated attention blocks are multiplied by the original attention blocks (step S24). Then, the processing for the attention blocks ends.

Figure 5:
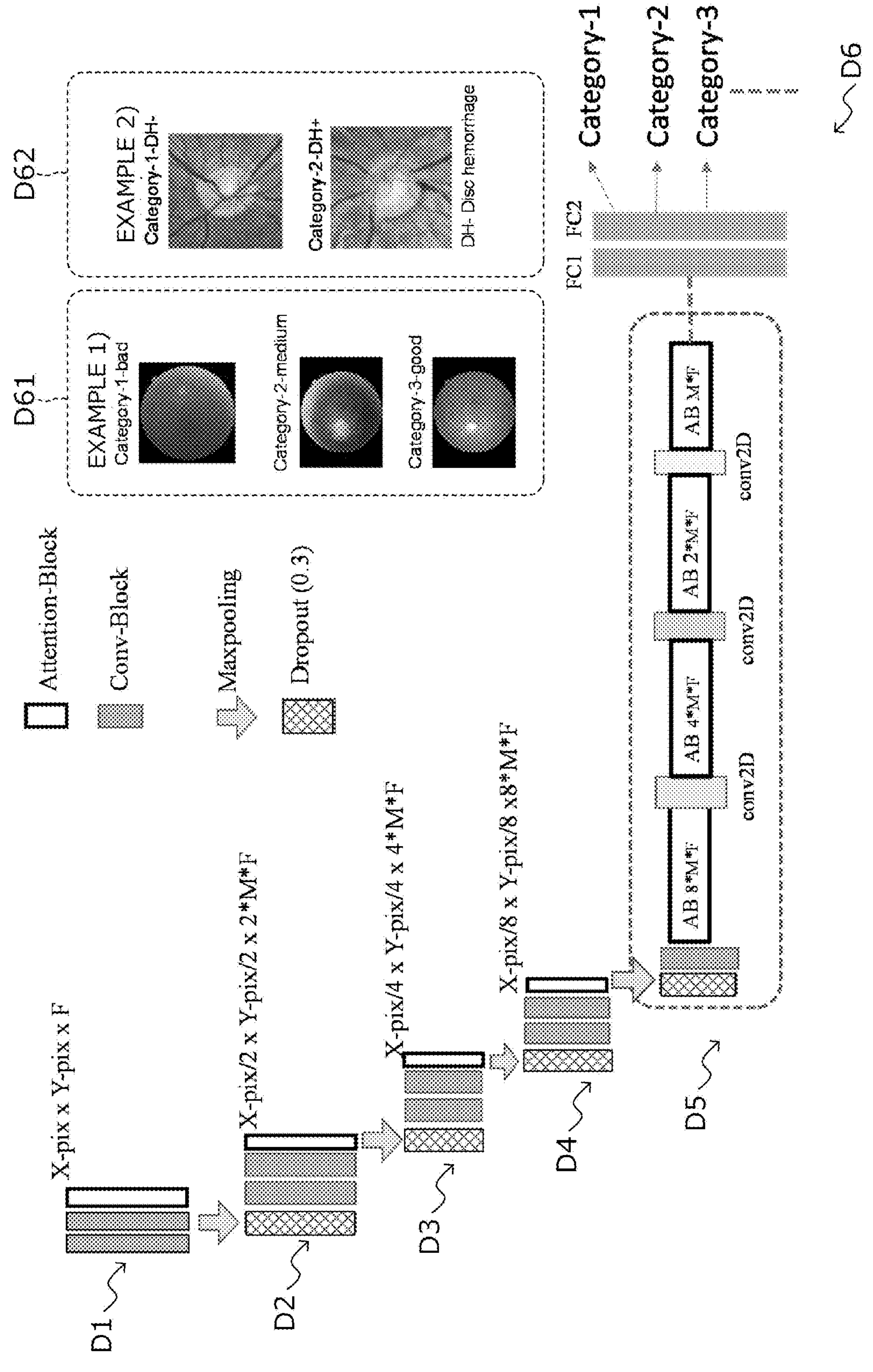
FIG. 5 is a diagram for describing a contraction process and a classification process in the segmentation process illustrated in FIG. 3.

FIG. 5 is a diagram for describing a contraction process and a classification process in the segmentation process illustrated in FIG. 3.

A block input to the segmentation process contracts to X-pix*Y-pix*F as indicated by reference numeral D1. M is a value equal to or greater than 1 based on the image size, and "-pix" represents pixels. The block further contracts to X-pix/2*Y-pix/2*2*M*F as indicated by reference numeral D2. F is a value equal to or greater than 8 based on the image size. The block further contracts to X-pix/4*Y-pix/4*4*M*F as indicated by reference numeral D3. The block further contracts to X-pix/8*Y-pix/8*8*M*F as indicated by reference numeral D4.

The number of channels is reduced to 8*M*F, 4*M*F, 2*M*F, and M*F in four stages at the bottleneck (i.e., in the middle block) indicated by reference numeral D5. Then, an FC1 layer and an FC2 layer are output as indicated by reference numeral D6. The output may be classified into Category-1, Category-2, Category-3, and the like. In the example (EXAMPLE 1) indicated by reference numeral D61, the data is classified into three categories: "Category-1-bad", "Category-2-medium", and "Category-3-good". In addition, in the example (EXAMPLE 2) indicated by reference numeral D62, the data is classified into two categories: "Category-1-DH-" and "Category-3-DH+". Note that, DH- represents no hemorrhage, and DH+ represents hemorrhage being present.

Figure 6:
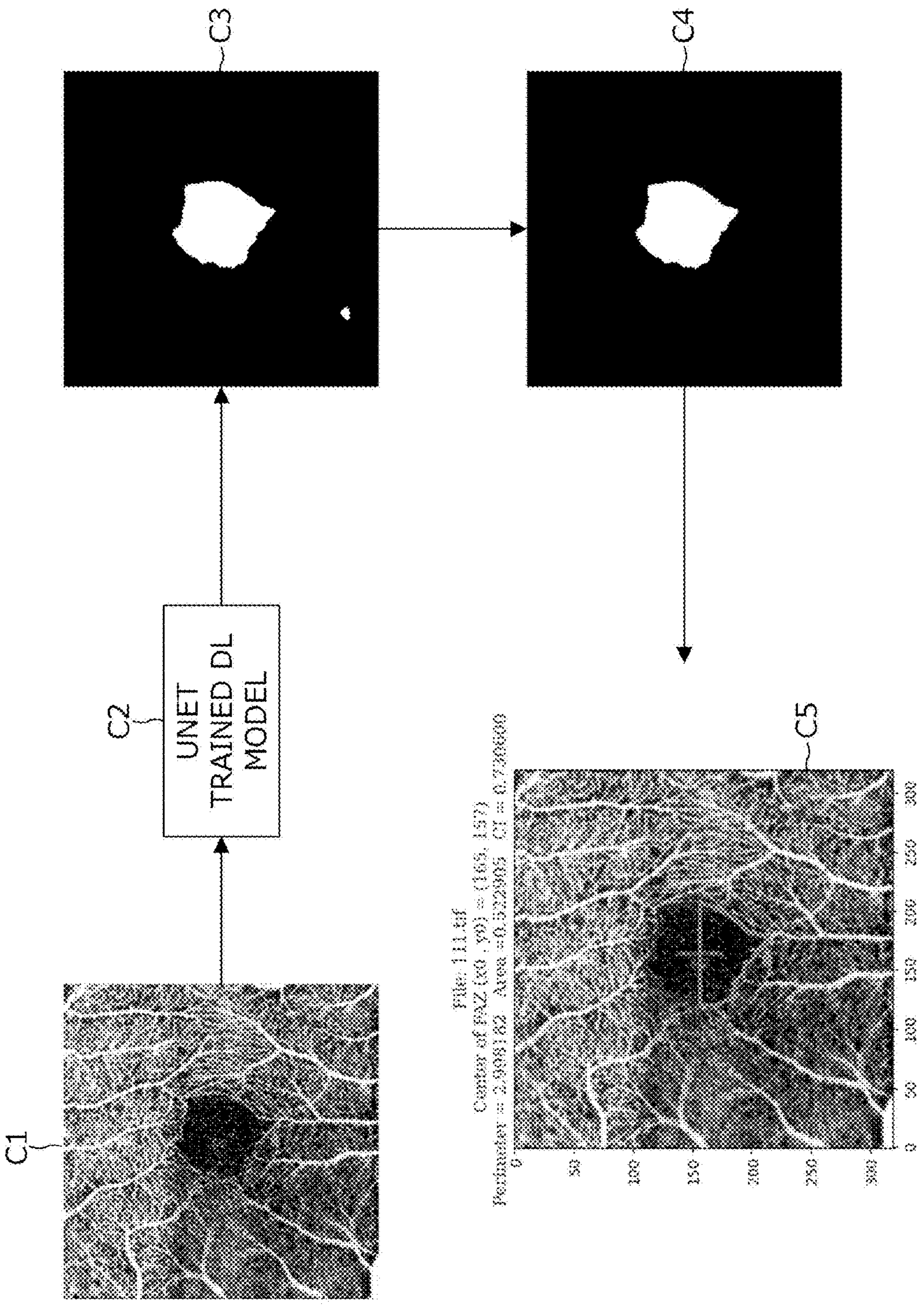
FIG. 6 is a diagram for describing a fake FAZ removal process as an embodiment.

FIG. 6 is a diagram for describing a fake FAZ removal process as an embodiment.

An unknown image is input to the DL model as indicated by reference numeral C1.

A trained DL model (Unet Trained DL model) is referred to in Unet as indicated by reference numeral C2.

The FAZ at the central portion of the image is corrected, and the fake FAZ at the bottom left portion of the image as indicated by reference numeral C3 is removed. As a result, an image indicated by reference numeral C4 is output.

Then, FAZ parameters are calculated as indicated by reference numeral C5.

FIG. 7 is a table in which the performance of different types of deep learning models are compared.

Segmentation of FAZ in OCTA images in the lightweight DL model (LWBNA_Unet) of the present embodiment was tested. In addition, for comparison, a standard Unet model was constructed with and without attention blocks.

FIG. 7 shows a summary of the total number of parameters in the model (Total parameters) together with the sizes of the output files generated after training (File size). Here, the name "Unet" stands for the related Unet architecture. "Unet_AB" uses channel/attention blocks in addition to the contracting and expanding paths of the related Unet architecture. The mean values of the model, 128 or 64, have a constant number of filters (128 or 64) per 2D regression layer. In some models, upsampling is used, and transposed convolution operations and a layer instead of connected layers are added to reduce the number of parameters that can be trained.

In FIG. 7, the performance of the trained DL model was tested with a test dataset of 145 OCTA images. The Dice similarity coefficients (Dice coefficient or D) between the manually segmented image and the image predicted by the DL model were calculated. A largest contour D was calculated by selecting the largest segmented region in the predicted image (if there are multiple FAZ areas). The standard deviation is the standard deviation. All models were trained for a fixed number of epochs (500).

Figure 8:
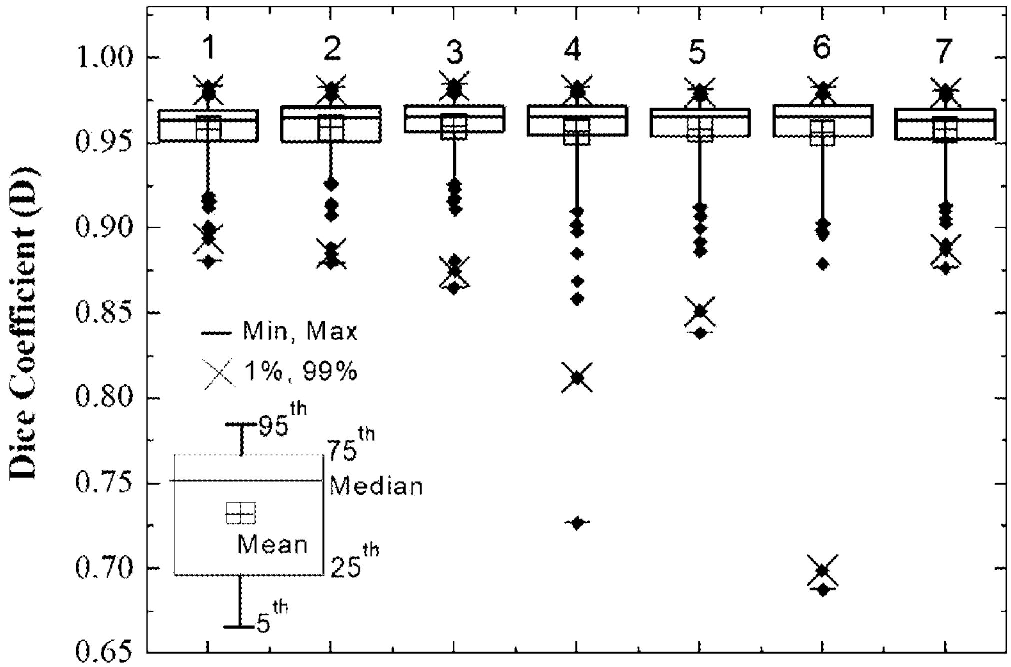
FIG. 8 is a graph obtained by comparing dice similarity coefficients of each of the types of deep learning models.
Figures 9A, 9B, 9C, 9D, 9E, 9F:
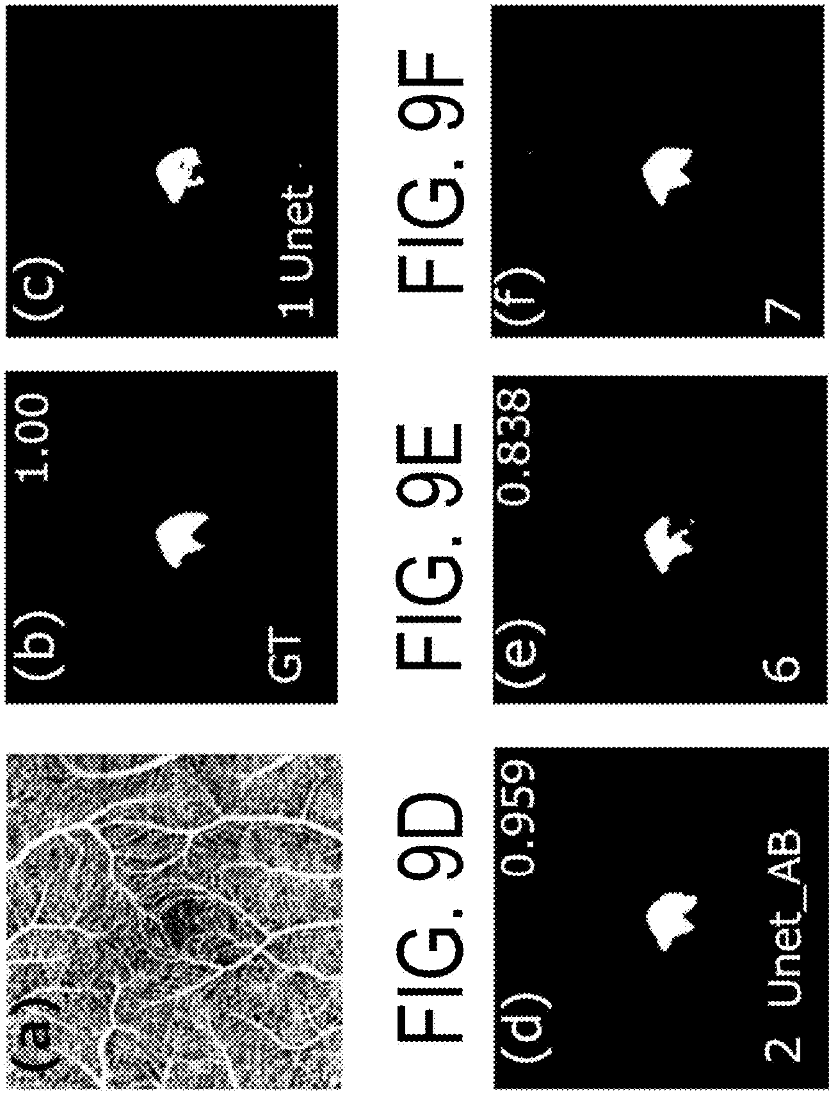
FIG. 9A is an OCTA image.
FIG. 9B is a FAZ area image of GT.
FIG. 9C is a FAZ area image of Unet.
FIG. 9D is a FAZ area image of Unet_AB.
FIG. 9E is a FAZ area image of Unet_AB_128_upsampling_Add.
FIG. 9F is a FAZ area image of LWBNA_Unet.

FIG. 8 is a graph obtained by comparing the dice similarity coefficients of the different types of deep learning models. FIG. 9A is an OCTA image, FIG. 9B is a FAZ area image of GT, FIG. 9C is a FAZ area image of Unet, FIG. 9D is a FAZ area image of Unet_AB, FIG. 9E is a FAZ area image of Unet_AB_128_upsampling_Add, and FIG. 9F is a FAZ area image of LWBNA_Unet.

According to the results of FIG. 7, it is difficult to determine which model is optimal for the segmentation of the FAZ. Thus, fragmentation of the FAZ area predicted by the DL model was analyzed using a box plot and is shown in FIG. 8. Each model has many outliers and their spread is minimal for Unet, Unet_AB, Unet_AB_upsampling, LWBNA_Unet. The minimum number of outliers with D≤0.94

(18) is for Unet_AB, whereas they are the same for Unet and LWBNA_Unet (21). In all three models, the 14 outliers are common with the same mean D of about 0.917. The main reason of D among these 14 outliers for indicating a low value is image blur and ambiguity in the FAZ boundaries due to the presence of too many scan lines. Accurate manual segmentation of the FAZ in these images is also difficult for humans. The remaining outliers (i.e., uncommon values) of each model have a D primarily in the range of 0.91 to 0.94, and in this case, the cause is also blurry images. In our observations, both Unet_AB and LWBNA_Unet are able to accurately segment the FAZ.

The OCTA image shown in FIG. 9A has a complex FAZ boundary due to its small size and the presence of relatively strong powder-like noise in the FAZ area. D obtained from Unet (FIG. 9C) and Unet_AB_128_upsampling_Add (FIG. 9E) is significantly lower than that obtained from LWBNA_Unet (FIG. 9F) and Unet_AB (FIG. 9D).

Figure 10:
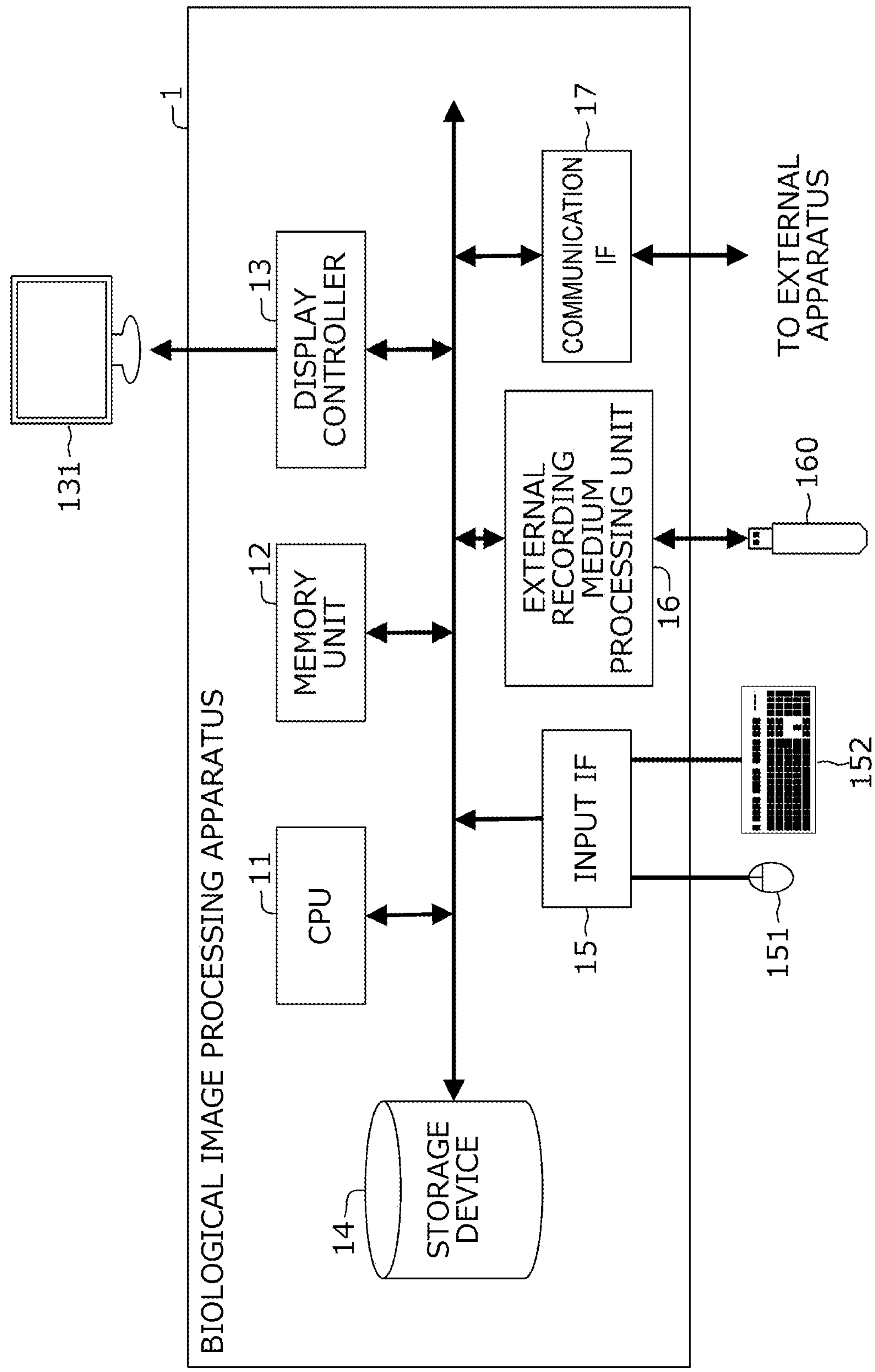
FIG. 10 is a block diagram schematically illustrating a hardware configuration example of a biological image processing apparatus as an embodiment.

FIG. 10 is a block diagram schematically illustrating a hardware configuration example of a biological image processing apparatus 1 as an embodiment.

The biological image processing apparatus 1 has a server function and includes a CPU 11, a memory unit 12, a display controller 13, a storage device 14, an input interface (IF) 15, an external recording medium processing unit 16, and a communication IF 17 as illustrated in FIG. 10.

The memory unit 12 is an example of a storage unit and a read only memory (ROM), a random access memory (RAM), and the like as an example. A program such as a basic input/output system (BIOS) may be written in the ROM of the memory unit 12. A software program in the memory unit 12 may be appropriately read and executed in the CPU 11. In addition, the RAM of the memory unit 12 may be used as a temporary recording memory or a working memory.

The display controller 13 is connected to a display device 131 and controls the display device 131. The display device 131 is a liquid crystal display, an organic light-emitting diode (OLED) display, a cathode ray tube (CRT), an electronic paper display, or the like, and displays various kinds of information for the operator, and the like. The display device 131 may be combined with an input device and may be, for example, a touch panel. In the present embodiment, the display device 131 displays information relating to segmented feature images. Further, a printing apparatus, which is not illustrated, or the like may realize output of the information relating to the segmented feature images.

The storage device 14 is a storage device with high I/O performance, and for example, a dynamic random access memory (DRAM), an SSD, a storage class memory (SCM), or an HDD may be used.

The input IF 15 may be connected to an input device such as a mouse 151 or a keyboard 152 to control the input device such as the mouse 151 or the keyboard 152. The mouse 151 and the keyboard 152 are examples of the input device, and an operator performs various input operations through these input devices.

The external recording medium processing unit 16 is configured such that a recording medium 160 can be mounted thereon. The external recording medium processing unit 16 is configured to be able to read information recorded in the recording medium 160, with the recording medium 160 mounted thereon. In the present example, the recording medium 160 is portable. For example, the recording medium 160 is a flexible disk, an optical disk, a magnetic disk, a magneto-optical disk, a semiconductor memory, or the like.

The communication IF 17 is an interface for enabling communication with an external apparatus.

The CPU 11 is an example of a processor and is a processing device that performs various types of control and calculation. The CPU 11 realizes various functions by executing an operating system (OS) and programs stored in the memory unit 12.

A device for controlling the overall operations of the biological image processing apparatus 1 is not limited to the CPU 11, and may be, for example, any one of an MPU, a DSP, an ASIC, a PLD, and an FPGA. In addition, the device for controlling the overall operations of the biological image processing apparatus 1 may be a combination of two or more of a CPU, an MPU, a DSP, an ASIC, a PLD, and an FPGA. Further, MPU is an abbreviation for micro processing unit, DSP is an abbreviation for digital signal processor, and ASIC is an abbreviation for application specific integrated circuit. In addition, PLD is an abbreviation for programmable logic device, and FPGA is an abbreviation for field programmable gate array.

Figure 11:
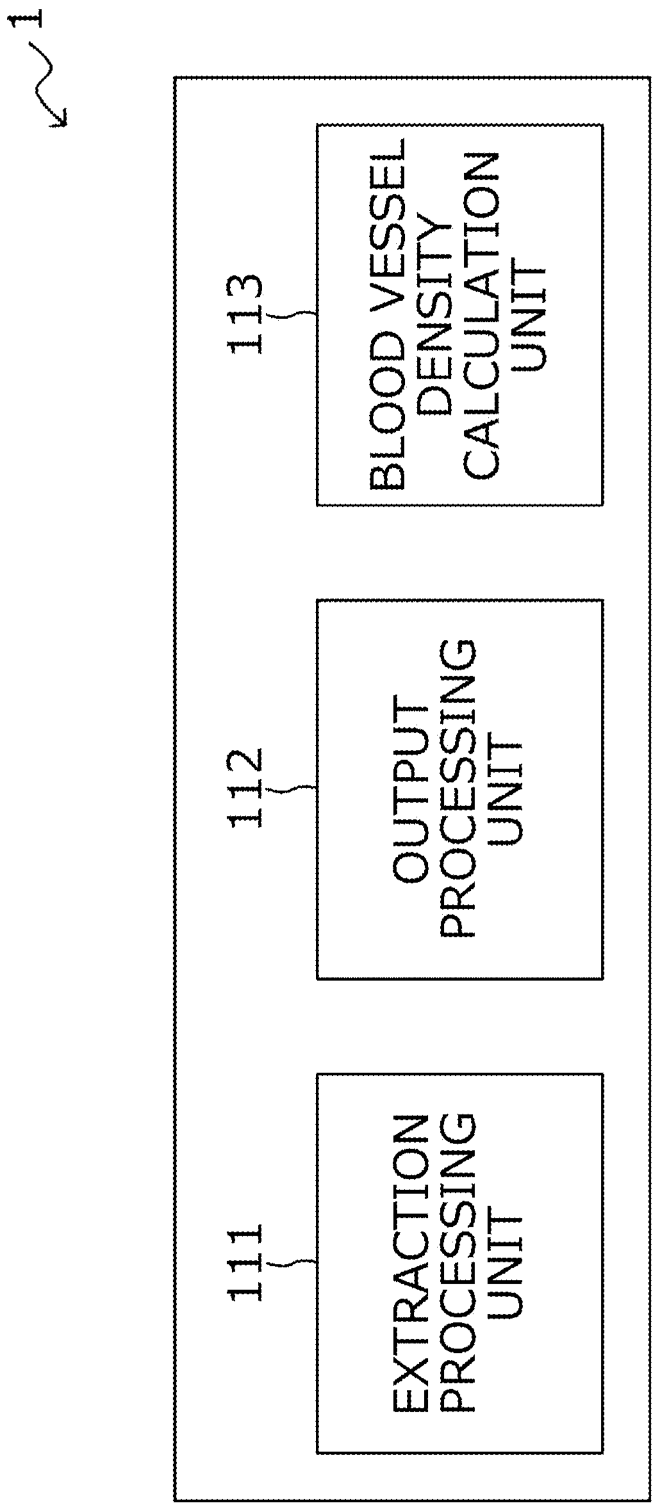
FIG. 11 is a block diagram schematically illustrating a software configuration example of the biological image processing apparatus illustrated in FIG. 10.

FIG. 11 is a block diagram schematically illustrating a software configuration example of the biological image processing apparatus 1 illustrated in FIG. 10.

The CPU 11 of the biological image processing apparatus 1 has functions as an extraction processing unit 111, an output processing unit 112, and a blood vessel density calculation unit 113.

The extraction processing unit 111 reduces the image size and extracts feature points, by adding an attention block for averaging channels to convolution blocks for the input biological image. In addition, the extraction processing unit 111 may extract feature points by preferentially reducing a region that does not include the outer shape or the vascular portion of the segmentation target site included in the biological image.

The output processing unit 112 outputs information relating to a feature image obtained by segmenting the biological image including the extracted feature points by contracting the channels in a state in which the attention block has been added to the convolution blocks. In addition, the output processing unit 112 may expand the channels to the size of the input biological image and output a feature image, after contracting the channels.

The blood vessel density calculation unit 113 calculates a vascular density for each of one or more regions in the eyeball based on the information relating to the feature image.

Thus, segmentation of a biological image can be accurately performed through simple arithmetic processing.

The disclosed technology is not limited to each of the embodiments, and can be carried out with various modifications without departing from the scope of each embodiment. Each configuration and processing operation of each embodiment can be selected as necessary, or may be appropriately combined.

Although an example in which the segmentation process is performed on the FAZ area from the biological image of an eyeball has been described in the above-described embodiment, the present disclosure is not limited thereto. The segmentation process according to the embodiment can be used to segment a specific site from various biological images by changing the DL model applied to LWBNA_U-Net according to the embodiment. For example, the segmentation process may be used to segment a tumor such as a cancer cell from an image obtained by imaging an organ of a living body. In this case, the image of the organ with the tumor may be applied to LWBNA_UNet in the embodiment as a DL model.

REFERENCE SIGNS LIST

1 Biological image processing apparatus
11 CPU
12 Memory unit
13 Display controller
14 Storage device
15 Input IF
16 External recording medium processing unit
17 Communication IF
100 Circuit diagram
101 npn-type transistor
102 Voltage VGG
103 Voltage VDD
104 Resistance RD
111 Extraction processing unit
112 Output processing unit
113 Blood vessel density calculation unit
131 Display device
151 Mouse
152 Keyboard
160 Recording medium

The invention claimed is:

1. A non-transitory computer readable storage medium encoded with computer readable biological image processing instructions, which, when executed by processor circuitry, cause the processor circuitry to perform segmentation of a biological image to perform:

reducing a size of the biological image that has been input and extracting a feature point, by adding an attention block for averaging channels to a convolution block for the biological image; and outputting information relating to a feature image obtained by segmenting the biological image including the extracted feature point, by contracting the channels in a state in which the attention block has been added to the convolution block.

2. The non-transitory computer readable storage medium according to claim 1, causing the processor circuitry to perform:

extracting the feature point by preferentially reducing a region not including an outer shape or a vascular portion of a segmentation target site included in the biological image.

3. The non-transitory computer readable storage medium according to claim 1, causing the processor circuitry to perform:

expanding the channels to the size of the biological image that has been input and outputting the feature image, after contracting the channels.

4. The non-transitory computer readable storage medium according to claim 1, causing the processor circuitry to perform:

calculating a vascular density for each of one or more regions in the biological image based on the information relating to the feature image.

5. The non-transitory computer readable storage according to claim 1, wherein the biological image is an image of an eyeball, and the computer readable biological image processing instructions causes the processor circuitry to perform outputting information relating to the feature image obtained by segmenting a foveal avascular zone of the eyeball.

6. A biological image processing apparatus for performing segmentation of a biological image, the biological image processing apparatus comprising:

processor circuitry configured to:

reduce a size of the biological image that has been input and extract a feature point, by adding an attention block for averaging channels to a convolution block for the biological image; and output information relating to a feature image obtained by segmenting the biological image including the extracted feature point, by contracting the channels in a state in which the attention block has been added to the convolution block.

7. The biological image processing apparatus according to claim 6, wherein the processor circuitry extracts the feature point by preferentially reducing a region not including an outer shape or a vascular portion of a segmentation target site included in the biological image.

8. The biological image processing apparatus according to claim 6, wherein the processor circuitry expands the channels to the size of the biological image that has been input and outputs the feature image, after contracting the channels.

9. The biological image processing apparatus according to claim 6, wherein the processor circuitry calculates a vascular density for each of one or more regions in the biological image based on the information relating to the feature image.

10. The biological image processing apparatus according to claim 6, wherein the biological image is an image of an eyeball, and the processor circuitry outputs information relating to the feature image obtained by segmenting a foveal avascular zone of the eyeball.

11. A biological image processing method for a computer configured to perform segmentation of a biological image to perform:

reducing a size of the biological image that has been input and extracting a feature point, by adding an attention block for averaging channels to a convolution block for the biological image, and outputting information relating to a feature image obtained by segmenting the biological image, by contracting the channels in a state in which the attention block has been added to the convolution block.

12. The biological image processing method according to claim 11 for the computer to perform:

extracting the feature point by preferentially reducing a region not including an outer shape or a vascular portion of a segmentation target site included in the biological image.

13. The biological image processing method according to claim 11, for the computer to perform:

expanding the channels to the size of the biological image that has been input and outputting the feature image, after contracting the channels.

14. The biological image processing method according to claim 11 for the computer to perform:

calculating a vascular density for each of one or more regions in the biological image based on the information relating to the feature image.

15. The biological image processing method according to claim 11, wherein the biological image is an image of an eyeball, and the biological image processing method for the computer to perform outputting information relating to the feature image obtained by segmenting a foveal avascular zone of the eyeball.

16. The non-transitory computer readable storage medium according to claim 2, causing the computer to perform:

expanding the channels to the size of the biological image that has been input and outputting the feature image, after contracting the channels.

17. The biological image processing apparatus according to claim 7, wherein the processor circuitry expands the channels to the size of the biological image that has been input and outputs the feature image, after contracting the channels.

18. The biological image processing method according to claim 12, for the computer to perform:

expanding the channels to the size of the biological image that has been input and outputting the feature image, after contracting the channels.

* * * * *